United States Patent
Smith et al.

(10) Patent No.: US 8,605,876 B2
(45) Date of Patent: Dec. 10, 2013

(54) METHOD FOR RE-CONFIGURING A COMMUNICATIONS DEVICE

(75) Inventors: Fraser Smith, London (GB); Mohit Punwani, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 13/395,361

(22) PCT Filed: Aug. 12, 2010

(86) PCT No.: PCT/GB2010/001532
§ 371 (c)(1),
(2), (4) Date: Mar. 9, 2012

(87) PCT Pub. No.: WO2011/039495
PCT Pub. Date: Apr. 7, 2011

(65) Prior Publication Data
US 2012/0170731 A1 Jul. 5, 2012

(30) Foreign Application Priority Data

Sep. 30, 2009 (EP) .................................... 09252314
Oct. 29, 2009 (EP) .................................... 09252507

(51) Int. Cl.
*H04M 1/56* (2006.01)
*H04M 15/06* (2006.01)
*H04M 1/64* (2006.01)
*H04M 3/42* (2006.01)

(52) U.S. Cl.
USPC ............... 379/142.05; 379/88.02; 379/201.12

(58) Field of Classification Search
USPC ............... 379/88.02, 142.05, 201.02, 201.03, 379/201.12; 455/411
See application file for complete search history.

(56) References Cited

U.S. PATENT DOCUMENTS

| | | |
|---|---|---|
| 2005/0228874 A1 | 10/2005 | Edgett et al. |
| 2008/0181141 A1 | 7/2008 | Krantz et al. |
| 2009/0068988 A1* | 3/2009 | Cofta ............................. 455/411 |
| 2009/0154663 A1 | 6/2009 | Thaper et al. |
| 2009/0156176 A1* | 6/2009 | Hao et al. ...................... 455/413 |
| 2012/0151196 A1* | 6/2012 | May et al. ........................ 713/1 |

OTHER PUBLICATIONS

International Search Report for PCT/GB2010/001532 mailed Feb. 10, 2011.

* cited by examiner

*Primary Examiner* — Quoc D Tran
(74) *Attorney, Agent, or Firm* — Nixon & Vanderhye P.C.

(57) ABSTRACT

A communications device (12) maintains profile data including a device identity and a calling line identity (CLI) associated with a PSTN connection (28) both on the device itself and also on an authentication platform (32), in order that the device can access a service (52) which requires knowledge of the CLI by way of a packet-switched connection (30). In the event that the CLI data in the communications device is corrupted or lost, the communications device transmits a request for re-authentication to a reactivation server (46) together with the device identity. On receipt of the request, the reactivation server retrieves the stored profile (50) from the authentication platform (32), and returns it to the communications device (12) to allow the profile to be restored. This process can be done without the user needing to send a new request for service over the PSTN link (28).

6 Claims, 3 Drawing Sheets

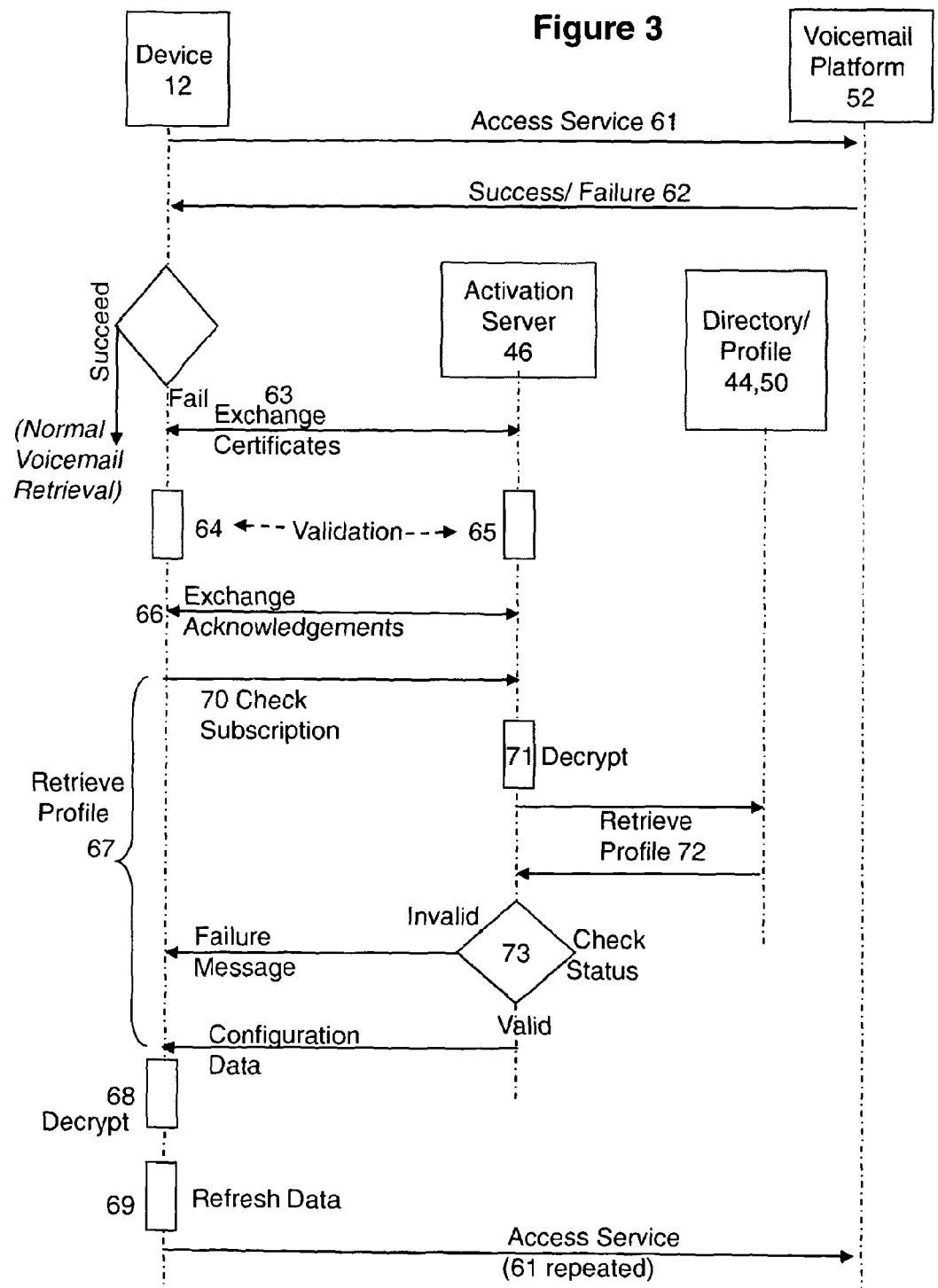

METHOD FOR RE-CONFIGURING A COMMUNICATIONS DEVICE

This application is the U.S. national phase of International Application No. PCT/GB2010/001532 filed 12 Aug. 2010 which designated the U.S. and claims priority to EP 09252314.1 filed 30 Sep. 2009 and EP 09252507.0 filed 29 Oct. 2009, the entire contents of each of which are hereby incorporated by reference.

The present invention relates to a method of operating a communications device, in particular to a method for the reactivation of a communications device which uses a connection-less packet-oriented communications protocol session for a service which requires the provision of credentials such as a password and/or identification of a physical communications line to which the communications device is attached.

The Internet Protocol is a connection-less packet-based communications protocol over which a number of telephony services can be provided, for example, VoIP (Voice over Internet Protocol), and also voicemail services. Access to voicemail service information using a conventional telephone communications device is well known in the art.

It is known for voicemail messages to be stored either in memory on the communications device itself, or in a remote storage facility, for subsequent retrieval. Functionality also exists for retrieving voicemail data from such a remote storage facility, using either the same communications device or another such communications device, or for retrieving voicemail data remotely from one communications device using a second communications device.

However, a user of a PSTN (public switched telephone network) connection cannot detect that a voicemail message is being left during a call with another user, even if a service such as "caller waiting" is provided. The "caller waiting" service merely alerts the user that there is another caller attempting to make a connection. Moreover, a user cannot retrieve a voicemail message stored in association with the calling line identity of a PSTN phone line whilst the PSTN phone line is being used conventionally, as the line is already occupied.

In some voicemail services, in order to access voicemail message information, a user needs to provide authentication information such as a user identity and password. This is time-consuming and problematic for the user. A communications device cannot automatically retrieve information if a user must provide such credentials every time that new information is to be retrieved.

It is possible for a communications device to access service information associated with a service identifier, in which authentication information is generated remotely from the communications device to uniquely configure access by the communications device to service information associated with said service identifier. The authentication information and the service identifier are presented to a service platform when the required service is to be initiated. This allows an identifier specific to the communications device to be used for retrieval. In particular, it allows data associated with a fixed line, such as a voicemail, to be retrieved over a connectionless packet switched system by the communications device, because its own identity has previously been associated with the line identity.

FIGS. 1 and 2 illustrate a communications system embodying such a system. FIG. 1 shows a communications system 10 in which a communications device 12 is arranged to access and retrieve service information from a remote service platform 32 by providing appropriate credential information to authenticate a data retrieval request. An example of a service platform 32 comprises a server offering a voicemail service. The service information to be retrieved is uniquely associated with a service identifier, for example, a calling line identifier. A calling line identifier is generated by any call originating from a specific termination of a public switched telephone network 28.

However, the service platform 32 as shown in FIG. 1 is also configured to enable service information to be retrieved using a service request sent using a second mode of communication 30 from which the service platform cannot directly retrieve the service identifier. For example, if a request for voicemail is sent to a server using a broadband IP session, the calling line identifier of the communications line 28 would not be apparent from the communications mode used to send the request.

The communications system 10 depicted in FIG. 1 comprises a plurality of communications devices 12 located on premises associated with respective communications service subscribers, although only one such communications device 12 is shown in FIG. 1. The communications device 12 shown in FIG. 1 comprises suitable data processing components 54, a data store 56, a display 14 and a user interface 16 which enables a user to control operation of the communications device and/or provide data input.

The communications device 12 is provided with two modes of communications capability. Telephone-type functionality, for example, may be provided on the communications device 12 through appropriate transmission and receiving components for connecting to the public switched telephone network (PSTN), means to go on/off-hook, microphone and speaker components. The communications device 12 may also, or instead, be provided with a communications-enabled interface 18 for communicating with at least one peripheral communications device 20, for example, a telephone communications device, using a suitable communications link 22, for example via a wireless local area connection (WLAN) such as Digital Enhanced Cordless Telecommunications (DECT) such as is shown in FIG. 1.

The communications device 12 is arranged to communicate over a a conventional public switched telephone network (PSTN) line 28 between the subscriber premises and the local exchange of the PSTN (not shown in FIG. 1) using at least two different modes of communications via a suitable interface 27 which provides connectivity with a separate base-station 24 via a suitable wireless or wired communication link 26. As will be apparent to those of ordinary skill in the art, some or all of the communications functionality of base-station 24 may be integrated into the communications device 12.

The PSTN mode provides the identity of the communications line between the local exchange of the public switched telephone network (PSTN) and the subscriber premises on which the communications device 12 is located, and to which the communications device 12 is connected to via base station 24. This mode may also be used by other communications devices on the subscriber premises and the calling line identity or CLI will be directly derivable for the communications traffic sent using this mode of communication by any of the communications devices using the line in this mode of communication.

A second mode of communication 30 uses the same physical communications line as the first mode 28, but supports traffic sent using a connection-less data-packet mode of communication 30. This second mode of communication 30 provides a data communications service, for example an "always on" type of service such as that known as a "broadband" service. Broadband services offer a relatively high-bandwidth connection at least in the direction from the local exchange to the subscriber premises. Such services may use data communications protocols such as the Asymmetrical Digital Subscriber Line (ADSL) for example. The second mode of communications may be accessible directly by the communications device 12 and/or base station 14, or may instead be by way of a suitable data network access point 34, for example, a router or hub. Such an access point 34 may support wireless connectivity with the base station 24 and/or communications device 12 and/or with the server 32, using an appropriate high-bandwidth wireless communications protocol, for example, WiMax and/or WiFi.

In the communications system shown in FIG. 1, the communications device 12 uses the second mode of communication 30 to establish a data session between the communications device 12 and a service supporting platform or server 32. The same server 32 also provides a connection over the PSTN using the first mode of communication 28. However, the PSTN calling line identity information is not automatically determinable from the communications protocols which are used on the second means of communication 30. The second mode of communication 30 therefore does not associate the traffic with the physical line's CLI between the customer premises and the local exchange of the PSTN. This means that the CLI is not directly derivable for communications traffic sent using the second mode of communication 30.

In the embodiment shown in FIG. 1, the first mode of communication 28 and the second mode of communication 30 both utilise the same physical communications line linking the subscriber premises to the local exchange of the public switched telephone network (PSTN). However, it may instead utilise a wireless connection for at least part of the path taken between the communications device and the server 32. In either case, the identity of the telephone line associated with the subscriber premises is only capable of being detected from activity on the line associated with the first mode of communication 28. The second mode of communication uses a data session, for example an IP session as is shown schematically in FIG. 1. The data session is established and supported using data traffic which is packetised using a protocol such as the Internet Protocol which disassociates the data from a fixed path to its destination. As a result the data traffic sent using the second mode of communication 30 does not automatically contain any information providing a CLI for the physical line to the subscriber premises. Consequently, the CLI cannot be automatically determined from a data session using the second mode of communication 30, for example an Internet Protocol session, even when running over the same physical line as the first mode of communication 28.

As previously mentioned above, in FIG. 1, the communications device 12 communicates using both the first and second modes of communication via one or more suitable interfaces 27 with base station 24. However, in alternative embodiments of the invention, the communications device 12 incorporates some or all of the communications functionality of the base-station 24 directly. Where all communications functions are incorporated into the communications device 12, a separate base-station 24 is not required. Similarly, as would be well known to one of ordinary skill in the art, either or both of the base-station 24 and/or communications device 12 may also incorporate the communications functionality of a data network access point 34.

The service platform 32 provides service information, for example stored voicemails, to a communications device 12 requesting the service information if it is able to present credentials including an appropriate service identifier. Thus, if the service platform 32 is set up to recognise a calling line identifier as a service identifier, it can retrieve service information comprising voicemail information left for the PSTN number associated with that calling line identifier and thus provide the requested voicemail service. The service information (for example, voice messages and/or equivalently any other subscription specific service data, such as video messages, facsimile messages, electronic mail messages, text-messaging messages, etc) is stored in association with the service identifier so that the service information stored for one subscriber can be distinguished from service information stored for other subscribers to the service.

The service platform 32 can only deliver the required data if the required service identifier can be associated with the request for service information generated by the communications device 12 generating the request. As shown in FIG. 1, the communications device 12 is configured to use the second data communications mode 30 to establish a connection-less packet-based session with the remote service providing platform 32, and this mode of communications does not enable the service platform to determine the service identifier from the service request which is needed to access the service data provided by service platform 32. The service identifier is needed as this provides authentication information which is required to associated the voicemail service with a particular subscriber to the PSTN telephone service for whom the original voicemail is intended (the PSTN number to which the initial call was made), identified through the CLI of the communications link between the local exchange to the customer premises associated with that particular subscriber.

In order to retrieve the correct voicemail or other user-specific data using the service platform 32, the communications device 12 must be configured appropriately so that it can generate requests which include credentials which enable the service identifier to be presented to the service platform 32 when the communications device 12 seeks to retrieve service information. The communications device 12 may be configured to include the service identifier with any requests it generates for service information, or it may be configured to provide its communications device identifier in any such requests, so as to enable an intermediate server to retrieve a service identifier and/or any other authentication information required and to forward these to the service platform.

Each communications' device 12 is configured and activated using configuration information unique to that device so that service information can be retrieved without requiring manual input (e.g. by a user) of authentication data such as a username and/or password to identify the specific service subscription. In this way, the configured communications device 12 is able to automatically retrieve the service information from a remote service platform 32 using the communications system.

FIG. 2 of the accompanying drawings shows a communications device configuration process in which, as part of the configuration process, a configuration computer program is run on the communications device 12. The same numbering system as was used in FIG. 1 is retained for like elements of the system depicted in FIG. 2.

In FIG. 2 the communications device runs a configuration computer program which automatically triggers the generation of a first communications message which uniquely identifies the communications device by incorporating a unique communications device identifier, for example, its serial number, which is addressed to a registration server 40.

As part of this configuration process, the line identity and communications device identity are stored by an authorisation server in the network to allow new services to be activated as required. There is therefore a requirement for an initial association to be established between the PSTN line and the communications device's identity, by a registration process by which the CLI of the telephone line, generated in a call made to the server, is used to make this association.

The first communications message is sent out over the communications line via the local exchange using the first mode of communications 28 to the addressed registration server 40 by way of a message server 36. For example, in one embodiment of the invention, the first communications message comprises a short message service (SMS) text message and the message server 36 comprises a PSTN SMS server.

The message server 36 processes the received first message and processes it to extract the forwarding address for the registration service and the CLI of the line used by the first communications mode 38. The message server 36 determines from the registration server address that even if that CLI has not registered for the message service, the message to the registration server should be forwarded. This is advantageous as it means that a user of the service for which the communications device 12 is to be configured need not have previously registered with the message server 36 for the messaging service over the PSTN.

As shown in FIG. 2, the first communications message is then forwarded to a registration server 40 which processes the message to determine the presence of the communications device identifier and associates this identifier with the service identifier, here the CLI of the communications line used by the first mode of communications via which the first communications message was sent.

The registration server 40 then pushes the service identifier (the CLI) and the communications device identifier information to a data store 44 to locate and/or update credential data stored on data store 44 to associate the service identified by the CLI with the communications device identifier and the CLI. For example, a data record 50 may be stored which has a data structure which associates the CLI with the communications device identity of communications device 12. In some embodiments of the invention, the data record 50 has a data structure which associates the CLI with one or more entries for communications device and/or service characteristics, for example, if one or more services are to be provided for a CLI and if so, whether the service has been activated on a particular communications device identified in the data structure. This enables service identifiers to be associated with the communications device identifier for a plurality of different service subscriptions and also enables unique configuration information, for example, additional authentication information such as a network generated password or authentication code can be associated with a particular service identifier and/or communications device identifier.

The data is stored in such a way that a look-up operation can be performed using the communications device identifier to retrieve the associated credential information, for example, the associated CLI and/or any authentication information such as a passwords etc.

As shown in FIG. 2, the registration server 40 pushes the service identifier (the CLI) and any other information extracted from the SMS such as the communications device identifier via a communications link 42 to a remote data store 44 however it is not essential for data store 44 and registration server 40 to be remotely located. As would be obvious to one of ordinary skill in the art the data store 44 and registration server 40 may be supported by the same physical platform. The data store 44 is any suitable indexed data storage facility, for example, a database, which is configured to associate a service identifier such as a CLI for a subscriber with a particular communications device identifier etc. It may also provide a means to store other information in association with a CLI, such as authentication information; as well as information for billing and/or service provision related purposes.

After the data store 44 has been updated, the record for a service identifier such as a CLI is associated with a communications device identity for the communications device 12. The updating of the record may also generate additional authentication information for the service identified by the service identifier in some embodiments of the invention.

The data records 50 of the data store 44 thus have a data structure enabling a data record 50 to be located when the activation server 46 performs a look-up operation or similar index retrieval operation based on at least a communications device identifier and/or additional information. If the communications device identifier is determined to be associated with a service-identifier, the activation server 46 amends the data record 50 to indicate that the service is now active for the communications device and CLI.

The data record 50 for a particular communications device identifier may also store additional information in association with the communications device and/or service identifiers, for example, authentication information may be stored and/or other information with which the communications device 12 may be uniquely configured. This configuration data is retrieved by the authentication server 46, or it may be generated in another embodiment of the invention by the server 46 once it has received confirmation that the service is now active.

The configuration process continues with the communications device 12 being sent a registration acknowledgement, in response to a prompt transmitted over one or other of the available means of communication 28, 30. This acknowledgement includes service profile data including the service identifier (CLI), and other data necessary to access the service. The communications device 12 stores the profile data in a memory 56.

Once unique configuration data has been sent to communications device 12 using the data session supported by the second mode of communication 30, it is used by the continuing configuration process to uniquely configure communications device 12.

Thus the communications device 12, after the configuration data has been downloaded from the service activation server 46, is able to complete the configuration process. The configuration information downloaded enables the communications device to generate requests for one or more service that the communications device was found to be associated with in the data store 12.

In order to access a service platform 52 over the second communications network 30, the communications device retrieves the service profile from its memory 56 and generates a communication message includes data which at least identifies the communications device 12 by means of the communications device identifier.

A problem may arise if the authentication data stored in a communications device becomes corrupted, such that it can no longer automatically provide its profile information (specifically the CLI) when required to access a service using the connectionless packet system.

The present invention provides a process by which a communications device can re-generate its profile automatically, without following the initial registration system. This process is particularly suited to the service described in the previous application, but may be used in other contexts as well.

According to the invention, there is provided a method for re-configuring a communications device in which profile data is maintained for access to a communications service platform, wherein profile data relating to the communications device is stored on an authentication platform, and the profile data is also stored in the communications device and in which:

if the communications device detects that the profile data is no longer stored in the communications device, the communications device generates a request for re-authentication, and transmits the request to a reactivation server together with the communications device identity, on receipt of the request, the reactivation server retrieves the stored profile data associated with the communications device identity from the authentication platform and returns it to the communications device the communications device stores the retrieved profile data.

In practice, the reactivation process is an additional function of the activation server which initially generated the profile data.

A second aspect of the invention provides a communications device in which profile data is maintained for access to a communications service platform, having provision for storing profile data relating to the communications device and configured such that, in the event of such profile data being determined to be absent from the communications device, it generates a request for re-authentication, and transmits the request to a reactivation server together with the communications device identity, and on receipt of the requested re-authentication profile data, to store the retrieved profile data.

Complementary to the second aspect, a third aspect of the invention provides a communications service platform, comprising an authentication platform for storing profile data relating to one or more associated communications devices, together with identity data for the associated communications devices, and configured to receive a request from a communications device for re-authentication together with an identity for the communications device, and comprising a reactivation server for retrieving the stored profile data associated with the communications device identity in response to such a request and returning it to the communications device.

In the preferred arrangement, the profile data is initially generated by a first mode of communications in which a calling line identity apparent to the authentication platform is associated with a device identity, and the calling line identity is stored by the authentication platform and the device as part of the profile data for use in subsequent interactions between the communications device and the authentication platform over a second mode of communications in which the calling line identity is not apparent to the authentication platform except as part of the profile data delivered to the authentication platform. If the profile data is lost by the user device, it can then be retrieved using the second mode although the second mode does not have visibility of the CLI when interacting with the device.

An embodiment of the invention will now be described by way of example, with reference to the accompanying drawings, in which:

FIG. 3 shows schematically a process for re-activating the communications device in the event of loss of the profile data provided to the communications device in the initial activation process, according to the present invention.

Figure 1:
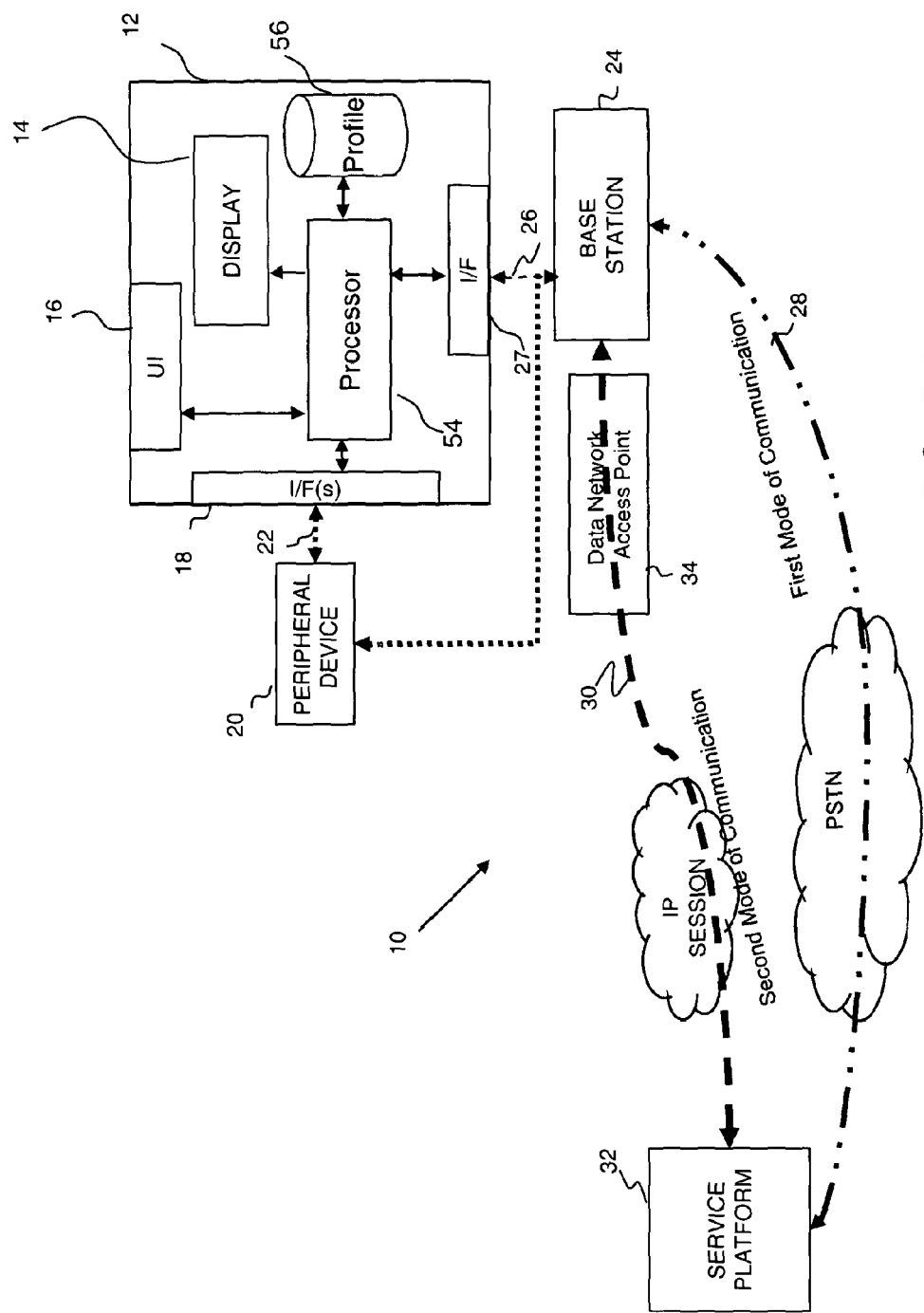
FIG. 1 shows schematically a communications system for providing a service to a communications device, as already described.
Figure 2:
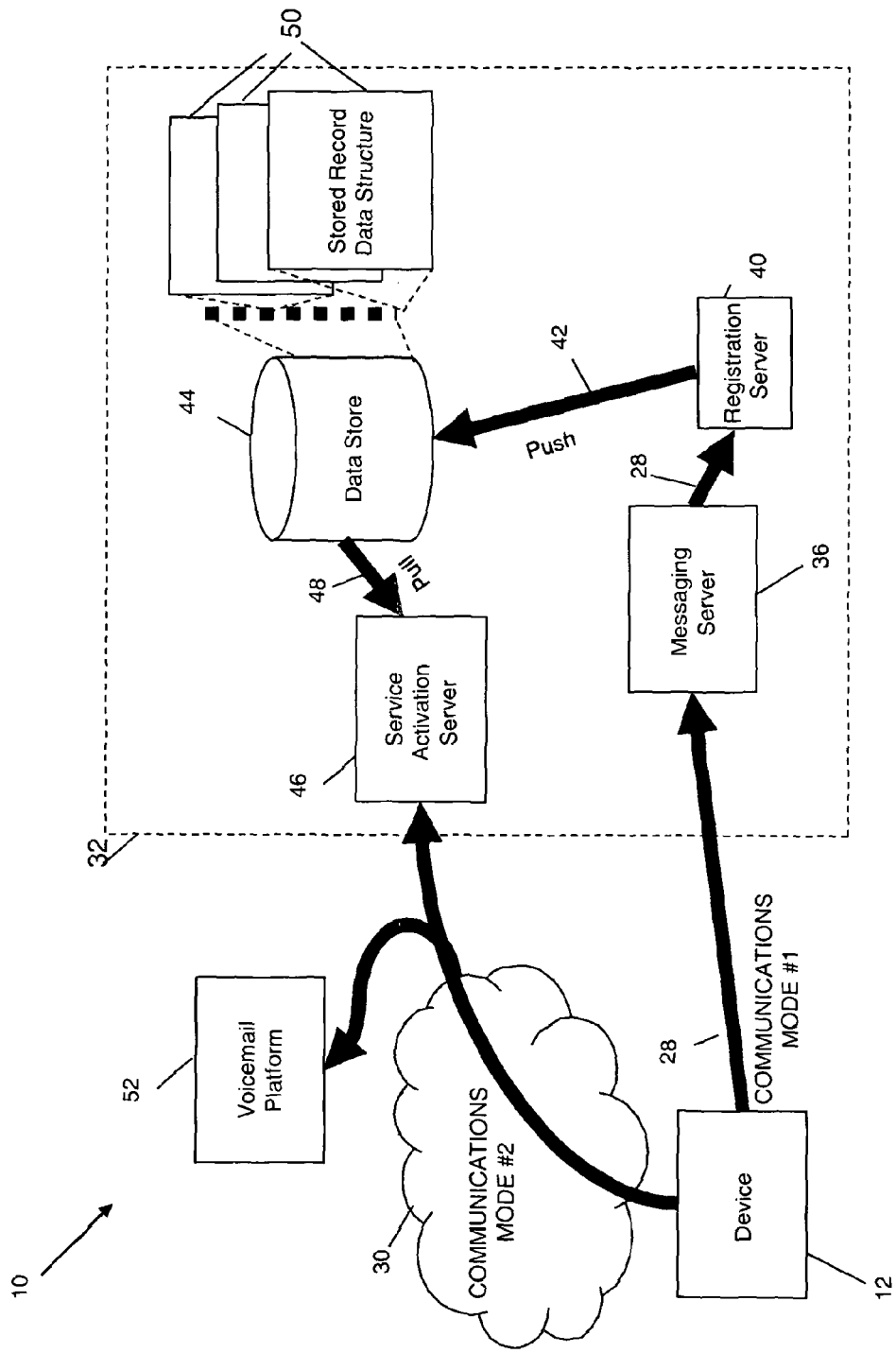
FIG. 2 shows schematically a service activation system for the initial activation of a communications device to allow access to a service, by generating providing user profile data for use by the communications device, as already described.

FIGS. 1 and 2 relate to various methods of configuring a communications device for use in a method of accessing service information as already discussed.

It is possible for the data in the memory 56 of the communications device to become corrupted or deleted by accident, or if settings have to be restored to a state previous to that at which the settings were stored. It would be possible to reinstate the profile data by repeating the initial configuration process, but this may be difficult to achieve, and inconvenient if the profile includes access to a large number of services.

The present invention allows the profiles to be re-instated on the communications device 12 automatically. This is achieved by using the profile data previously stored in the network, specifically in the data store 44, as will now be described with reference to FIG. 3.

FIG. 3 depicts the information flows transmitted over the data network 30 (FIG. 2) between the network elements depicted in FIG. 2, namely the user's communications device 12, the service platform 52, the activation server 46, and the data 50 stored in the directory 44 associated with the activation server.

The process begins when the user communications device 12 initiates an attempt 61 to access the service platform 52. In normal use, the user communications device provides its profile information as part of the request, in particular the calling line identity associated with the communications device's address on the PSTN 28, which has previously been identified as described above, and any authentication data. This information is used by the service platform 52 to identify the user to which the request relates. This allows the service platform to provide user-specific data, for example voicemail messages sent by callers to the PSTN line.

However, it is possible for the profile data stored by the user communications device 12 to have been corrupted or lost, such that it no longer corresponds to the data required by the service platform. It is also possible for the data held by the service platform 52 to have been modified, perhaps because the user's subscription to the service has ceased, or because the owner has requested service no longer be made available to that particular communications device because it is no longer in the subscriber's possession, having been replaced, sold, lost or stolen. In either case, there will be a mismatch between the profile data provided by the communications device 12 making the request 61 and the profile data held by the service provider 52, and the service platform 52 will return an authentication failure message 62.

The communications device 12 is programmed to respond to such a failure message by attempting to restore its profile data. This may be done by the communications device automatically, or in response to an input provided by a user in response to a message displayed on the communications device when it receives a service failure message 62.

In order to attempt to re-establish the service, the communications device 12 initiates a session with the activation server 46. This is done through a handshake process 63-66 in which the communications device 12 and the activation server 46 exchange public key certificates, and each performs a respective validation processes 64, 65 on the other's certificate to ensure authenticity. If these validations are successful, they each transmit an acknowledgement 66 to the other.

A secure communications session 67 has now been established between the communications device 12 and the activation server 46. The communications device 12 now transmits a request 70 to check its subscription, using the encryption provided by the activation server's public key. The request includes the device's equipment code. The activation server decrypts the request using its private key (step 71) and retrieves the user profile 50 from the directory 44 (step 72). The activation server 46 checks whether the required service is marked "active" on the user profile 50 (step 73).

The activation server 46 now returns a message 74 to the communications device 12. This message is encrypted using the public key provided by the device 12. If the required service is not marked "active" the message is such as to cause the display 14 on the device to display a message to that effect. If the required service is marked "active" the activation server extracts the information required to reconfigure the device from the profile data and transmits it to the device 12 in the message 74. This information includes the CLI data needed to match the device identity to the user details required by the service platform 52.

The communications device 12, on receiving the encrypted message, uses its private key to decrypt the message (step 68) and uses the data in the message to restore its user profile.

For security, the profile 50 is updated with a new password, which is communicated to the activation server 46 (step 72) and thus to the device 12 (step 68).

The device may now re-attempt connection to the service platform 52 (step 61 repeated). As before, the user communications device provides its profile information as part of the request, in particular the calling line identity associated with the communications device's address on the PSTN 28, which has previously been identified as described above, and any authentication data. This information is used by the service platform 52 to identify the user to which the request relates, allowing the service platform to provide user-specific data, for example voicemail messages sent by callers to the PSTN line.

This process allows re-configuration to take place in the background without any active participation by the user.

If the device is not currently registered with the activation server, the information required will not be present in the user profile 50. In such a case the user may be prompted to initiate the activation process which has been described previously with reference to FIG. 2.

The invention claimed is:

1. A method for re-configuring a communications device in which profile data is maintained for access to a communications service platform, wherein profile data relating to the communications device is stored on an authentication platform, and the profile is also stored in the communications device, the method comprising:
    if the communications device detects that the profile data is no longer stored in the communications device, the communications device generating a request for re-authentication, and transmitting the request to a reactivation server together with the communications device identity,
    on receipt of the request, the reactivation server retrieving the stored profile data associated with the communications device identity from the authentication platform and returning it to the communications device,
    the communications device storing the retrieved profile data;
    wherein the profile data is initially generated by interaction of the communications device with the authentication platform, such that the authentication platform generates a profile associated with the communications device identity, for storage by the authentication platform, such that the data can subsequently retrieved by the communications device; and
    wherein the profile data is initially generated by a first mode of communications in which a calling line identity apparent to the authentication platform is associated with a device identity, and the calling line identity is stored by the authentication platform and the device as part of the profile data for use in subsequent interactions between the communications device and the authentication platform over a second mode of communications in which the calling line identity is not apparent to the authentication platform except as part of the profile data delivered to the authentication platform.

2. The method according to claim 1, in which the communication device detects the absence of the required profile data by receipt from a service platform, in response to an attempt to access a service from the service platform, of a notification of failure to access the service.

3. The method according to claim 1, wherein the reactivation process is a function of the authentication platform.

4. A communications device in which profile data is maintained for access to a communications service platform, having provision for storing profile data relating to the communications device, the communications device comprising:
    a processing system, including a computer processor, the processing system being configured to:
        in the event of such profile data being determined to be no longer stored in the communications device, generate a request for re-authentication, and transmit the request to a reactivation server together with the communications device identity; and
        on receipt of the requested re-authentication profile data, to store the retrieved profile data;
        generate profile data by interaction with the authentication platform, such that the data can subsequently retrieved by the communications device; and
        store a calling line identity as part of the profile data for use in subsequent interactions between the communications device and the authentication platform over a second mode of communications in which the calling line identity is not apparent to the authentication platform except as part of the profile data delivered to the authentication platform.

5. The communications device according to claim 4, the processing system being further configured to attempt to access a service from a service platform and, in response of a notification of failure to access the service, identifying that the required profile data is absent.

6. A communications service platform, comprising:
    an authentication platform for storing identity data for one or more associated communications devices, together with profile data relating to, and also stored on, one or more associated communications devices, the platform being configured to receive a request from a communications device for re-authentication together with an identity for the communications device;
    a reactivation server for retrieving the stored profile data associated with the communications device identity in response to such a request and returning it to the communications device;
    means for interaction with the communications device so as to generate a profile associated with the communications device identity, for storage such that the data can subsequently retrieved by the communications device; and wherein the communications service platform is configured to generate the profile data by a first mode of communications in which a calling line identity apparent to the authentication platform is associated with a device identity, and the calling line identity is stored by the authentication platform as part of the profile data for use in subsequent interactions between the communications device and the authentication platform over a second mode of communications in which the calling line identity is not apparent to the authentication platform except as part of the profile data delivered to the authentication platform.

* * * * *